United States Patent Office 3,302,724
Patented Feb. 7, 1967

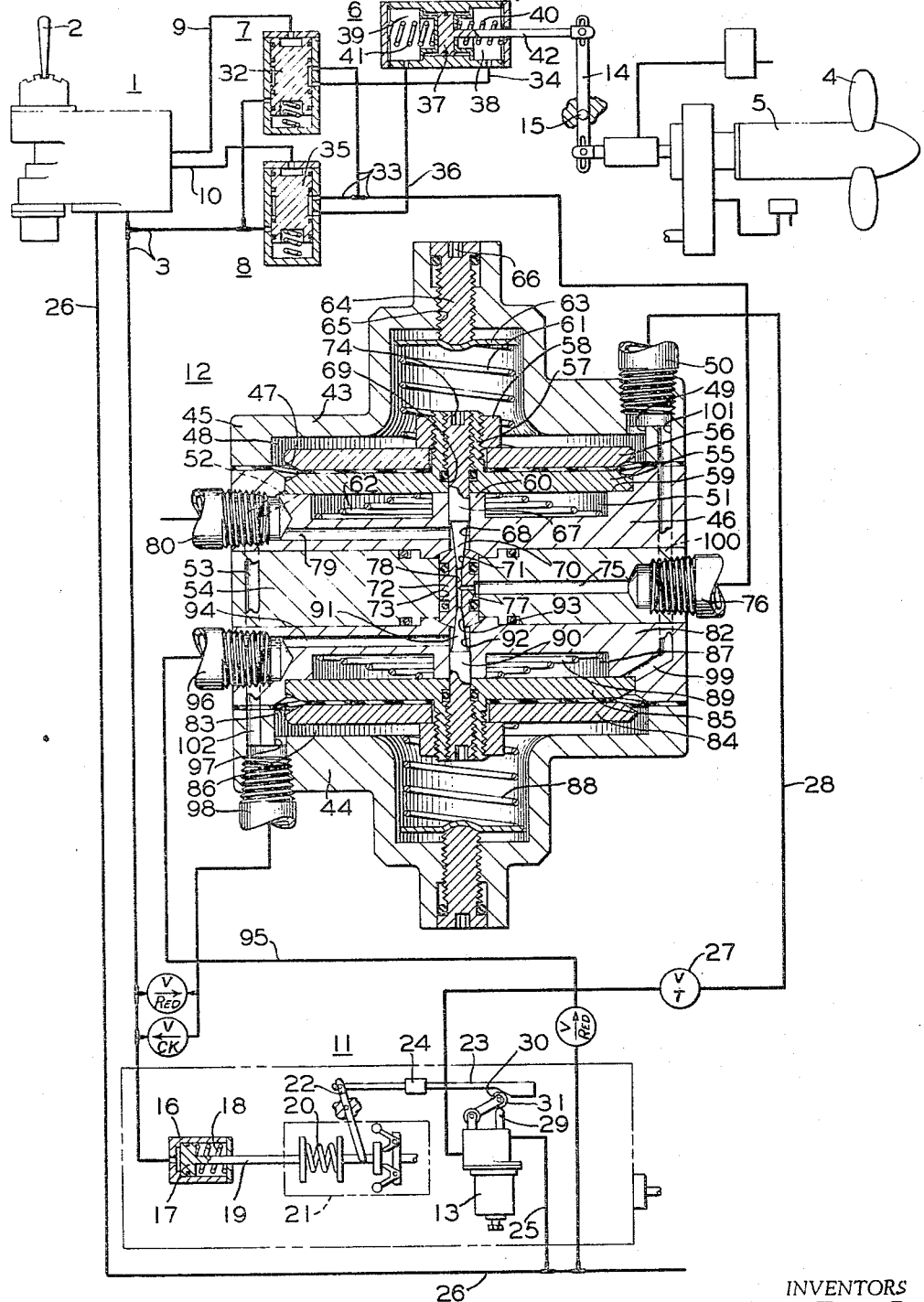

3,302,724
AUTOMATIC CONTROL APPARATUS FOR
VARIABLE PITCH PROPELLERS
Ralph C. Brooks, Ahoskie, N.C., and Paul E. Olson,
Lexington, Ky., assignors to Westinghouse Air Brake
Company, Wilmerding, Pa., a corporation of Pennsylvania
Filed June 11, 1965, Ser. No. 463,161
2 Claims. (Cl. 170—135.74)

This invention relates generally to automatic control apparatus for variable pitch propellers, and relates specifically to a new control valve means therein for stabilizing propeller pitch.

Heretofore, as for example in Patent No. 2,958,381, filed by R. R. Stevens, et al. and patented Nov. 1, 1960, and assigned to the same assignee as the present invention, it has been proposed to control marine propulsion engines and propellers by way of a variable fluid control pressure, hereinafter referred to as speed pressure supplied through forward or astern valves to operate a propeller pitch control mechanism, and which speed pressure is also simultaneously supplied to provide a preload to an engine governor which opposes the preload pressure as the engine speed increases, and which in turn controls the position of a fuel rack controlling fuel supply to the engine so that the pitch of the propeller normally will automatically change in proportion to the engine speed. In order to provide a means for automatically reducing the propeller pitch to relieve an engine overload condition, there is provided a load-sensing valve device providing a load pressure in accordance with fuel rack position to oppose the speed pressure in a propeller pitch modifying valve device, which responds to pressure differential therebetween to provide speed pressure to actuate the propeller pitch reducing control mechanism when the load pressure is the higher, and for venting the pressure from the pitch reducing mechanism when the load-sensing pressure is lower. A stabilizing volume and a choke are provided in the line between the pitch modifying valve device and the propeller pitch control mechanism to reduce the frequency of change in applying or reducing pressure to the pitch control mechanism because of the tendency of the propeller pitch to be continuously changed when the engine is working at or near the rated power.

The foregoing apparatus performs its function effectively; however, its pitch modifying valve device is limited to the purpose of reducing propeller pitch in response to overload conditions.

It is the object of this invention to provide in the propeller pitch control mechanism of the type above described, in substitution for the pitch modifying valve device, the control volume and the choke, a new and simple pitch modifying valve device subject to speed control pressure and fuel rack position for providing a graduated control pressure to the propeller pitch control to not only effect a decrease in propeller pitch when engine load is greater than the rated value of the selected speed pressure, but, in addition effects increase in propeller pitch when the speed control pressure is greater than the rated speed pressure value, to thus effect continuous stabilization of the propeller pitch to provide a uniform optimum load on the engine at all speeds.

In the present invention, this object is achieved by a pitch control arrangement which may comprise a double-acting power cylinder subject opposingly to fluid pressures in one chamber and in another chamber and biased, when said fluid pressures are substantially equal, to a neutral or flat edge position, an ahead selector valve device for connecting said one chamber to one communication or another communication according to whether an ahead line is charged with fluid under pressure or vented by an operator, an astern selector valve device for connecting said other chamber to said one communication or said other communication according to whether an astern line is charged with fluid under pressure or vented by an operator; these ahead and astern lines being charged selectively when the operator desires that the vessel move ahead and astern, respectively; a speed line chargeable with fluid at a selectable pressure by the operator according to a desired engine speed for charging the one communication; a load-sensing valve device, preferably controlled by a cam on the fuel rack of the engine, for providing a load-controlled fluid pressure corresponding to load condition of the engine as denoted by fuel rack position; and a pitch modifying valve device for charging or venting the other communication depending upon whether said load-controlled fluid pressure is greater than or less than, respectively, the speed line pressure.

Thus, according to the present invention, there is provided a pitch control arrangement embodying novel means controlled by a load-controlled pressure which varies according to engine load, and an opposing force which varies according to desired engine speed; said pitch modifying means being operative in response to pressure differential between the load pressure and the opposing speed pressure to either increase or decrease propeller pitch in accordance with a lower or higher load pressure, respectively, relative to speed pressure and thereby either increase or decrease, respectively, the engine load until said load pressure is substantially equal to the existing value of the speed pressure, so as thereby to prevent overloading of the engine and at the same time maintain maximum propeller pitch appropriate for the desired speed of the engine.

These and other objects will become more readily apparent when taken in conjunction with the following description and the drawing which is a single drawing figure comprising a sectional view of a propeller speed and pitch control mechanism disclosing the invention.

Referring now to the drawing, there is shown an automatic control apparatus for variable pitch propellers comprising an operator-controlled valve device 1 of the well-known type used on ships and including valve means (not shown) operable by movement of the handle 2 to selectively adjust the pressure of fluid in a speed line 3, which speed line pressure is utilized in a first manner to control the pitch of propeller blades 4 by way of a pitch adjusting mechanism 5 controlled by a double-acting power cylinder 6 and one or the other of an ahead valve 7 and an astern valve 8 selectively operable by control valve 1 by way of ahead and astern fluid pressure lines 9 and 10, respectively, and which speed line pressure is also utilized in a second manner to simultaneously control the speed of an engine 11. A pitch modifying valve device 12 is operable in response to the predominant one of the speed pressure and the load pressure provided by a load-sensing valve device 13 in the engine to modify operation of the double-acting cylinder 6 to further control the propeller pitch.

The valve device 1 may be of the type disclosed in the aforementioned Patent No. 2,958,381, in which movement of the handle 2 in one direction or the other from neutral charges ahead line 9 or astern line 10, respectively, to operate ahead valve 7 or astern valve 8, respectively. Thereafter, movement of the handle in a direction perpendicular to the first movement is operable to provide in speed line 3 fluid at a selectable pressure corresponding to the extent of the second movement of handle 2. The structural details of the valve device 1 are not necessary to an understanding of the present invention and, accordingly, the detailed description thereof is omitted.

The pitch adjusting mechanism 5 may be of the type disclosed in the aforementioned Patent No. 2,958,381, in which movement of a lever 14 clockwise about its pivot 15 in response to operation of double-acting power cylinder 6 adjusts the astern pitch of the propeller blades 4 in accordance with the extent of movement of lever 14 from the neutral position shown, and, conversely, counterclockwise movement of the lever adjusts the ahead pitch in accordance with the extent of movement of the lever from the neutral position shown. The structural details of the pitch adjusting device are not necessary to the understanding of the present invention and, accordingly, the detailed description thereof is omitted.

The engine 11 may be of a conventional type such as shown in the aforementioned Patent No. 2,958,381, and comprises an actuator device 16 having a piston 17 reciprocably movable in a casing and subject opposingly to fluid pressure in the speed line 3 and to pressure of a spring member 18 in an atmospheric chamber. Coaxially connected to piston 17 is a piston rod 19 extending externally of actuator 16 and operatively engaging a speeder spring 20 of a conventional flyball-type governor 21. When fluid pressure in speed line 3 overcomes the opposing force of spring 18, piston 17 will be shifted and, through piston rod 19, will impose on speeder spring 20 a bias or preload, proportionate to the net force on the piston, thus causing governor 21 to control the rockable position of a suitably fulcrummed lever 22 which, in turn, controls the axial position of a fuel rack 23 of a fuel injection pump 24 that controls fuel supply to the engine 11.

The load-sensing valve device 13 may be of the type disclosed in the aforementioned Patent No. 2,958,381, which is operable to supply from a branch pipe 25 of main supply pipe 26 through a choke 27 to a pipe 28 fluid at a pressure proportionate to the extent of depression of a control stem 29 by way of movement of a cam 30 on fuel rack 23 which vertically moves a roller 31 to depress stem 29. Thus, depression of the stem 29 will operate to provide fluid in pipe 28 at a load-controlled pressure proportionate to engine load as denoted by axial position of the fuel rack 23.

The ahead selector valve 7 comprises a spring-biased valve 32 operable to selectively connect speed pipe 3 or a pipe 33 to a pipe 34 according to whether ahead valve 7 is charged or vented, respectively. The astern selector valve 8 comprises a spring-biased valve 35 operable to selectively connect speed pipe 3 or a pipe 33 to a pipe 36 according to whether astern valve 35 is charged or vented, respectively. These devices are identical to those shown in Patent No. 2,958,381.

The power cylinder 6 comprises a piston 37 reciprocably disposed within a sectionalized casing and subject opposingly to pressures of fluid in a chamber 38 open to pipe 34 and in a chamber 39 open to pipe 36. Helical bias springs 40, 41 are provided in chambers 38, 39, respectively, and are suitably caged to limit the extent of their expansion in the direction of piston 37. When the pressures of fluid in chambers 38, 39 are substantially equal, piston 37, and hence a piston rod 42 connected to the piston and extending exteriorly of the casing, is biased by springs 40, 41 to a neutral or flat pitch position, as shown, the piston rod 42 being connected to previously described lever 14 to position the same in the neutral pitch position as described above. When pressure in either chamber 38 or 39 exceeds that in the other chamber, the spring in the pressurized chamber is caged and the piston is moved against the lower pressure and spring pressure in the other chamber to shift the piston in direction of the fluid pressure to move rod 42 and thus move lever 41 about its pivot 15 to adjust the pitch in accordance with the fluid pressure differential between chambers 38 and 39.

The pitch modifying device 12, as hereinafter described in detail, is new and novel and comprises a first movable abutment type valve means 43 responsive to excessive speed line pressure relative to load line pressure to increase the pitch of the propeller, and a second movable abutment type valve device 44 responsive to excessive load line pressure relative to speed line pressure to decrease the pitch of the propeller.

The movable abutment valve device 43 comprises a pair of abutting casing members 45, 46 attached to one another in any suitable manner, and tightly holding therebetween the peripheral edge of a movable abutment member 47, preferably of the flexible diaphragm type, and forming on the one side of the diaphragm a chamber 48 open at passageway 49 in casing member 45 to a pipe fitting 50 connected to load pressure pipe 28, and forming on the other side of the diaphragm a chamber 51 open via passageway 52 in casing member 46 to one end of a through passage 53 in a bracket member 54 to which casing member 46 is attached in any suitable manner, the through passage 53 being connected to receive, in a manner hereinafter described, speed line pressure for transmission to passage 52 and chamber 51.

A diaphragm follower 55, disposed in chamber 51, and a diaphragm follower 56, disposed in chamber 48, are positioned to tightly grip the diaphragm 47 therebetween by way of an exteriorly threaded stud 57 centrally disposed on follower 55 and extending axially through the diaphragm 47 and the follower 56 into chamber 48. A nut member 58 is disposed on the distal end of stud 57 to provide a clamping action upon diaphragm 47 between the followers. A shoulder 59 on the interior wall of casing section 46 cooperates with a centrally raised portion 60 on the end wall of casing 46 to provide a downward limit to movement of the diaphragm, and to establish the normal position of the diaphragm and followers, with follower 55 resting thereon, as shown. A pair of helical springs 61, 62 in chambers 48 and 51, respectively, bias the follower 46 into the normal position shown, the tension of spring 61 being adjustable to slightly exceed the pressure of spring 62 by a predetermined amount by way of a plate member 63 disposed in chamber 48 on the end of a stud 64 threaded for axial movement in a threaded bore 65 disposed through one end of casing member 45 coaxially with respect to spring 61, a keyway 66 being provided in one end of stud 65 to provide adjustment of the stud exteriorly of the casing element 45.

A needle valve member 67 is disposed for axial slidable movement in a through bore 68 axially positioned in raised portion 60 on the wall of casing 46, one end of the needle valve being threadedly received for axial movement in a through bore 69 coaxially disposed in the stud 57, and the other end of the needle valve being tapered at 70 and extending through the wall of casing element 46 for sealingly seating in a correspondingly tapered valve seat 71 in a valve seat member 72 fixedly received in a central through bore 73 in bracket 54 when the pressures in chambers 48 and 51 are substantially equal and when the diaphragm and associated followers are in the normal position shown. A keyway 74 is provided in the end of needle valve 67 for axially adjusting the same to provide proper seating thereof in valve seat 71 when the followers are in the normal position shown.

The purpose of needle valve 67 is to vent pipe 33 when a preponderance of pressure in chamber 51 over that in chamber 48 moves diaphragm 47 upwardly to unseat the tapered end 70 from valve seat 71. Venting is achieved by providing in bracket 54 a radial passageway 75 connected exteriorly of the bracket 54 by way of a fitting 76 to pipe 33, the inner end of the passage communicating with a cross-bore 77 in valve seat member 72, the cross-bore intersecting a passage 78 coaxially disposed in valve seat member 72 and which passage 78 communicates with valve seat 71. A radially disposed bore 79 in casing member 46 communicates at one end with needle valve bore 68, and at the other end communicates with atmosphere through casing 46, the exterior end of passage 79 being provided with a fitting 80, if desired. Thus, when needle valve member 67 is unseated, fluid pressure is vented from pipe 33 by way of fitting 76, passages 75, 77 and 78, valve seat 71, bore 68, and passage 79 to atmosphere.

The diaphragm valve device 44 is disposed on the opposite side of bracket 54 and comprises structure identical to that of the above-described diaphragm valve 43, including a pair of casing members 81 and 82, a diaphragm element 83 and associated follower members 84, 85 forming a pair of chambers 86, 87, biasing springs 88, 89, and a needle valve 90 having a tapered end 91 disposed in valve bore 92 and normally seated in valve seat 93 in previously described valve seat 72 wherein the valve seat 93 communicates with previously described passage 78 in valve seat member 72.

The purpose of needle valve 90 is to effect charging of previously described passage 33 when a preponderance of pressure in chamber 87 over that in chamber 86 moves diaphragm element 83 downwardly to unseat needle valve 90. Charging of pipe 33 is achieved by providing in casing element 82 a radial passageway 94 connected at one end exteriorly of casing 82 to supply line 26 by way of pipe branch 95 and fitting 96, and communicating at the inner end with valve bore 92 so that unseating of the needle valve 90 communicates pressure in passage 94 through bore 93, and passages 78 and 77 to previously described passage 75 and fitting 76 to pipe 33.

The fluid pressure chamber 86 is open to a passage 97 which communicates with a fitting 98 and previously described speed line 3. The fluid pressure chamber 87 is open to a through passage 99 in casing member 82 communicating with a through passage 100 in bracket member 54.

Referring now to valve devices 43 and 44 collectively, it will be observed that additional passages 101, 102, respectively, communicate with the previously described fittings 50 and 98, respectively, at one end, and with passages 100 and 53, respectively, in bracket member 54. Thus, it will be observed that with respect to speed line 3 and fitting 98, speed line fluid pressure is provided through fitting 98 in a first direction through passage 97 to chamber 86 of valve device 44, and in a second direction through passages 102, 53 and 52 to chamber 51 in valve device 43. Similarly, fluid pressure provided by load pressure line 28 to fitting 50 is provided in a first direction through passage 49 to pressure chamber 48 in valve device 43, and in a second direction through passages 101, 100 and 99 to fluid pressure chamber 87 in valve device 44. Thus, it is seen that when speed line pressure in pipe 3 exceeds load line pressure in pipe 28, needle valve 67 is unseated to vent line 33 through fitting 76, passages 75, 77, 78, seat 71, and passage 79 to atmosphere. Conversely, when load line pressure in line 28 exceeds speed line pressure in line 3, needle valve 90 is unseated to introduce supply pressure from supply line branch 95, through fitting 96, passage 94, bore 92, seat 93 to passages 78, 77, 75 and fitting 76 to line 33.

OPERATION

Assume initially that the supply line 26 is charged with fluid at a predetermined appropriate pressure, and that handle 2 of valve device 1 is in the neutral position in which it is shown. Under these conditions, the speed line 3, ahead line 9, and astern line 10 will be vented concurrently; the fuel rack 23 will be in a fuel-off position; the ahead and astern selector valve devices 7 and 8 will respectively connect pipes 34 and 36 to pipe 33; needle valves 67 and 90 of pitch modifying valve device 12 will be biased into seating engagement with their respective valve seats to disconnect pipe 33 from atmosphere and from fluid supply; supply pressure will be supplied by way of pipe 95 and passage 94 to bore 92 for availability with respect to the charging of pipe 33 when needle valve 90 is unseated, as hereinafter described; and power cylinder 6 will be biased to its flat pitch position. Hence, all components will be in the respective positions in which they are shown in the drawings.

To move the vessel ahead, the fuel rack 23 is moved to idle position, the engine is started, and the handle 2 of valve device 1 is initially moved rightward in its slot (not shown) to its ahead position, in which ahead line 9 is charged from supply line 26 through valve device 1 for causing ahead selector valve device 7 to connect pipe 3 to pipe 34, while astern line 10 is maintained vented for causing valve device 8 to maintain pipe 33 connected to pipe 36. Handle 2 is then moved from the ahead position into the ahead speed zone for providing in speed line 3 fluid at a selected pressure corresponding to a desired speed of engine 11 as selected according to the extent of movement of said handle into said speed zone.

Fluid under pressure will normally flow from speed line 3 via device 7 and pipe 34 to chamber 38 of power cylinder 6 causing the piston 37 and piston rod 42 to be moved lengthwardly against resistance of spring 41 for providing ahead pitch proportionate to the degree of pressurization of chamber 38. Ahead pitch will thus normally increase directly with speed line pressure.

Meanwhile, when the bias force of speed line pressure exceeds the opposing bias force of spring 18 of actuator device 16, piston 17 will shift and increase the bias on the governor speeder spring 20 and thus cause the governor 21 operatively to shift fuel rack 23 leftward so as to increase fuel supply to the engine 11; and the load-sensing valve device 13 will operate to supply fluid via throttle valve 27 to pipe 28 at a pressure proportional to engine load condition as denoted by axial position of the fuel rack cam 30.

Meanwhile, the speed line pressure is provided from line 3 through fitting 98 and passageway 97 to chamber 86 in valve device 44 to bias the already seated needle valve 90 towards its seated condition, and through passages 98, 102, 53 and 52 to chamber 51 in valve device 43 to bias the diaphragm 47 upwardly to unseat needle valve device 70.

Meanwhile, as the engine speed increases in accordance with the speed line pressure applied to operate speed rack 23, the load pressure valve 13 is controlled thereby to provide an output pressure in accordance with the load through line 28, fitting 50, and passage 49 to fluid pressure chamber 48 for biasing the already seated diaphragm valve 47 downwardly to seat needle valve 67, and through passages 101, 100, and 99 to chamber 87 of valve device 44 to bias diaphragm valve device 83 downwardly to unseat needle valve 90.

If at any time the engine should tend to become overloaded for the particular speed selected by the fluid pressure in fluid pressure line 3, the fuel rack 23 will be shifted leftward beyond the position called for by the bias of the speeder spring 20, thus effecting downward movement of stem 29 to increase the load pressure in line 28 to valve device 12 and to chambers 48 and 86 therein. Under this overload condition, the load pressure in chamber 87 exceeds the speed line pressure in adjacent chamber 86, thus moving diaphragm 83 downwardly for unseating needle valve 90. Fluid pressure is supplied through unseated needle valve 90 at a predetermined reduced pressure from supply 26, line 95, fitting 96, passage 94, bore 92, passages 78, 77, 75 in fitting 76, line 33, valve device 8 and line 36 to charge chamber 39 in valve device 6, thus providing a pressure opposing speed line pressure in chamber 38 to move the piston 37 rightward to effect a reduction in the ahead pitch and thereby a reduction in engine load until the load-controlled pressure in pipe 28 is reduced to the existing value of the speed line; whereupon the device 12 will assume its previously defined position with both needle valve 90 and 67 seated.

If the propeller pitch should at any time be less than the maximum pitch permissible without overloading the engine 11, that is, when the engine is working at less than rated loading for the speed called for by the fluid pressure in line 3, the load pressure in line 28 becomes less than the speed pressure in the speed line 3 so that in valve device 43, the speed line pressure in chamber 51 exceeds the load line pressure in chamber 41, whereupon diaphragm 47 is urged upwardly to unseat valve 67 to effect venting of chamber 39 through lines 36, 33, and passages 75, 77, 78 and 79 to atmosphere, in valve device 6, thus reducing the pressure opposing the speed line pressure in chamber 38 to effect leftward movement of piston 37 to increase the propeller pitch and thereby effect an increase in load on the engine until the load-controlled pressure in line 28 is increased to the existing value of the speed line pressure; whereupon the device 12 will assume its previously described position with both needle valves 90 and 67 seated.

To move the vessel astern, handle 2 of the valve device 1 is moved leftward to the astern position for charging astern line 10 while maintaining ahead line 9 vented, and thus causing valve device 8 to connect speed line 3 to pipe 36. Hence, while handle 2 is moved from astern position into the astern speed zone to provide fluid at a desired pressure in the speed line, such fluid will flow via the device 8 to chamber 39 of power cylinder 6 and cause the latter to operate to effect an increase in astern pitch from flat pitch to maximum. As will be understood from the previous description, the pitch modifying valve device 12 will operate to reduce astern pitch whenever engine load and hence load-controlled fluid pressure in pipe 28 exceeds the existing speed line pressure in speed line 3, or will operate to increase astern pitch when the load-controlled fluid pressure is less than the pressure existing in the speed line 3.

Having now described the invention, what we claim as new and desire to secure by Letters Patent, is:

1. An automatic control apparatus for variable pitch propellers, comprising:
   (a) means for providing a first pressure selectively variable in magnitude,
   (b) means responsive to said first pressure to vary the pitch of a propeller in accordance with the magnitude of said pressure,
   (c) means responsive to said first pressure for controlling the speed of an engine in accordance with the magnitude of said pressure,
   (d) means for providing a second pressure selectively variable in magnitude in accordance with the engine load, and
   (e) means responsive to pressure differential between said first pressure and said second pressure to modify the effect of said first pressure upon said pitch varying means to increase or decrease the propeller pitch depending upon whether said second pressure is less than or greater than, respectively, said first pressure and until said first pressure and said second pressure assume a predetermined minimum pressure differential therebetween.

2. The automatic control apparatus for variable pitch propellers, as recited in claim 1, but further characterized in that said means responsive to pressure differential comprises a first valve means responsive to a preponderance of said second pressure over said first pressure to oppose the first pressure acting upon said pitch varying means, and a second valve means responsive to a preponderance of said first pressure over said second pressure to provide a pressure assisting said first pressure acting upon the pitch varying means.

References Cited by the Examiner
UNITED STATES PATENTS 2,958,381   11/1960   Stevens et al. _____ 170—135.72

JULIUS E. WEST, *Primary Examiner.*